(12) United States Patent
Losey et al.

(10) Patent No.: US 6,668,889 B1
(45) Date of Patent: Dec. 30, 2003

(54) REINFORCEMENT PACKAGE FOR TIRES

(75) Inventors: Robert Allen Losey, Kent, OH (US); Alfredo Guillermo Causa, Akron, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 10/130,959
(22) PCT Filed: Dec. 21, 1999
(86) PCT No.: PCT/US99/30524
§ 371 (c)(1), (2), (4) Date: May 23, 2002
(87) PCT Pub. No.: WO01/45966
PCT Pub. Date: Jun. 28, 2001

(51) Int. Cl.[7] .............................. B60C 9/20; B60C 9/22
(52) U.S. Cl. ................... 152/527; 152/531; 152/533
(58) Field of Search ..................... 152/527, 531, 152/533

(56) References Cited

U.S. PATENT DOCUMENTS

| | | | |
|---|---|---|---|
| 3,570,574 A | * | 3/1971 | Marker et al. ............... 152/527 |
| 3,757,843 A | | 9/1973 | Carr |
| 4,688,615 A | * | 8/1987 | Lee ............................ 152/531 |
| 4,791,973 A | | 12/1988 | Davisson |
| 5,385,193 A | | 1/1995 | Suzuki et al. |
| 5,738,740 A | | 4/1998 | Cluzel |
| 5,931,211 A | | 8/1999 | Tamura |

FOREIGN PATENT DOCUMENTS

| | | |
|---|---|---|
| WO | 9836920 | 8/1998 |
| WO | 9847726 | 10/1998 |
| WO | 9924269 | 5/1999 |

* cited by examiner

Primary Examiner—Adrienne C. Johnstone
(74) Attorney, Agent, or Firm—Nancy T. Krawczyk

(57) ABSTRACT

A pneumatic tire (10) having a reinforcement package including a mid-ply belt having reinforcement at a 0° angle with respect to the equatorial plane (EP) of the tire shows improved handling and durability. The mid-ply belt comprises reinforcing cords or filaments (28) that are discontinuous. The dicontinuous cords or filaments (28) make possible the production of a uniform tire in most tire designs, and the reinforcement of the mid-ply belt provides a tire with improved durability and handling properties. A tire with superior properties was produced using reinforcing cords or filaments (27) and (28) which are made from polyethylene napthalate.

17 Claims, 6 Drawing Sheets

REINFORCEMENT PACKAGE FOR TIRES

TECHNICAL FIELD

The invention relates to pneumatic tires having a reinforcement package under the tread area which improves the durability of the tire.

BACKGROUND ART

In the production of high-performance tires, i.e., tires that are designed to run at high speeds, overlay reinforcement has been shown to reduce radial runout of the tire and to stabilize the tire footprint at high speeds.

In U.S. Pat. No. 4,791,973, issued Dec. 20, 1988, a high performance tire having a chopped overlay is described. Said patent is hereby incorporated herein by reference. By chopped overlay, it is meant that the reinforcement cords in the overlay material are discontinuous, i.e., the reinforcement cords are separated by interruptions at random locations in the overlay material. The chopped overlay is said to provide the tire with high-speed endurance without adversely affecting the uniformity of the tire.

U.S. Pat. No. 2,945,525 describes an annular layer comprising ringed shaped reinforcing elements which have at least one interruption per each circumference of the tire. The layer described in the patent is a belt layer which is the sole reinforcement of the crown area of the tire.

U.S. Pat. No. 4,688,615, issued Aug. 25, 1987 teaches a tire with a reinforcement package wherein belt material is used to make a 0° mid-ply belt, which is placed between conventional working belts in a tire. Said patent is hereby incorporated herein by reference. In the development of the mid-ply belt design, it was believed that placement of the mid-ply belt between belt reinforcement layers would provide durability and decrease interlaminar shear between the first and third belts. It was found that such a design concept can not be used in many tire designs, however, because the 0° reinforcement in the mid-ply belt pulls down against the cords of the radially inward first belt when the tire is cured, causing the cords in the first belt and the mid-ply belt to contact each other.

In the conception of the present invention, the inventors conceived the idea of using the chopped overlay concept in the development of a mid-ply belt, believing that separations in the cord reinforcement in the mid-ply belt would prevent the pull down of the cords of a radially inward belt. In the particular tire constructed, it was also found that increasing the diameter of the green tire improved the cord spacing between the belts in the reinforcement package.

It is an object of the present invention to provide a pneumatic tire which has improved durability.

Other objects of the invention will be apparent from the following description and claims.

DISCLOSURE OF INVENTION

A pneumatic tire of the invention comprises at least two parallel annular beads (12), at least one carcass ply (14) wrapped around the beads, tread (16) disposed over the carcass plies in a crown area of the tire, sidewalls (18) disposed between the tread (16) and the beads (12), and a reinforcement package (15a–e) comprising a plurality of belts or breakers disposed between the tread (16) and carcass (14). The tire of the invention is characterized in that the reinforcement package (15a–e) has at least one lower belt (23,24,34,44,54) comprising continuous parallel reinforcement cords or filaments (27) disposed radially inward in the reinforcement package, at least one upper belt (21,22,32,42, 52) comprising continuous parallel reinforcement cords or filaments (27) disposed radially outward in the reinforcement package, and at least one middle reinforcement ply (25,26,36,46,56) comprising discontinuous parallel reinforcement cords or filaments (28) disposed between the upper and lower belts. The discontinuous cords or filaments (28) are oriented substantially parallel to the centerline (31) of the reinforcement package (5a–e).

Several embodiments of the invention are disclosed. In a first embodiment, the reinforcement package comprises two upper belts (22), two lower belts (24) and one middle belt (26). In a second embodiment, the reinforcement package comprises one upper belt (21), one lower belt (23) and one middle belt (25). In other embodiments, the reinforcement package comprises two upper belts (32), one lower belt (34) and one middle belt (36); one upper belt (42), two lower belts (44) and one middle belt (46); and one upper belt (52), one lower belt (54) and two middle belts (56).

In each embodiment, the upper and lower belts have reinforcing cords (27) having alternating opposing angles of 15° to 38° with respect to the equatorial plane (EP), also known as the mid-circumferential or center-plane, of the tire.

In an illustrated embodiment, the reinforcing cords (27) in the upper and lower belts and reinforcing cords (28) in the mid-ply belt comprise polyethylene naphthalate.

DETAILED DESCRIPTION OF THE INVENTION

With reference now to FIGS. 1–5, in alternative embodiments of the invention, a belt package may be provided in a pneumatic tire that comprises 3 to 5 belts. In each of the constructions illustrated, at least one mid-ply belt, comprising a belt wherein the reinforcement therein is discontinuous and is disposed at 0° to 5° with resect to the EP of the tire, is disposed between conventional belts having continuous reinforcement disposed at opposing angles with resect to the centerline of the reinforcement package. Each of the alternative embodiments may be particularly useful in different types of tires, or for different handling properties or other physical characteristics of the tire.

The present invention is characterized in that the textile reinforcing elements of the mid-ply belt comprise aligned cord sections arranged in parallel rows, each having a length which is about ¼ to ⅓ of the corresponding circumferential development of the tire, the cord sections in each row having substantially the same length, and being separated by interruptions, such that the interruptions per circumferentially extending row of cords is less than 4% of the corresponding circumferential development of the tire.

By corresponding circumferential development of the tire, it is meant the circumference of the mid-ply belt, at the mid-circumferential plane of the tire when the tire is mounted on its design rim and it is inflated to its design pressure, but is not subjected to load.

Figure 1:
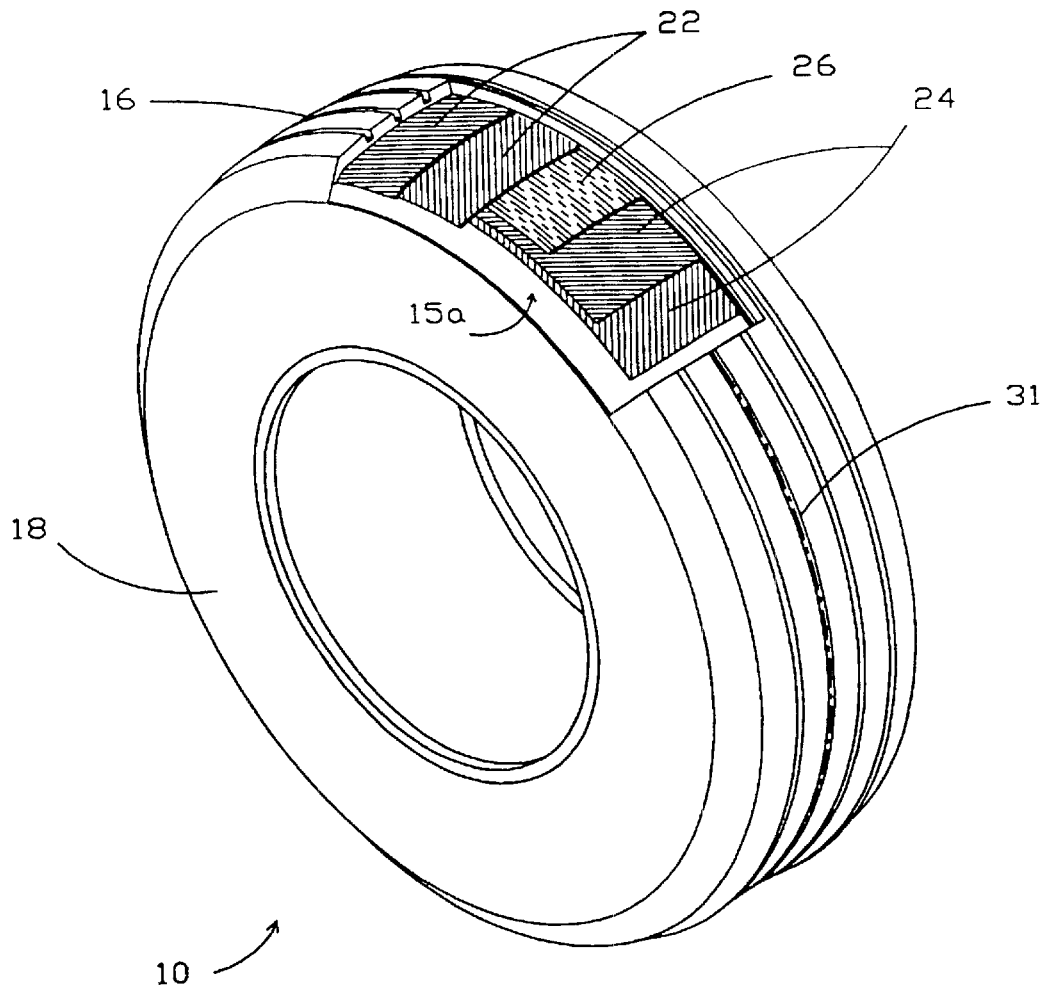
FIG. 1 illustrates a cut-away perspective view of a tire showing the belt package.
Figure 2:
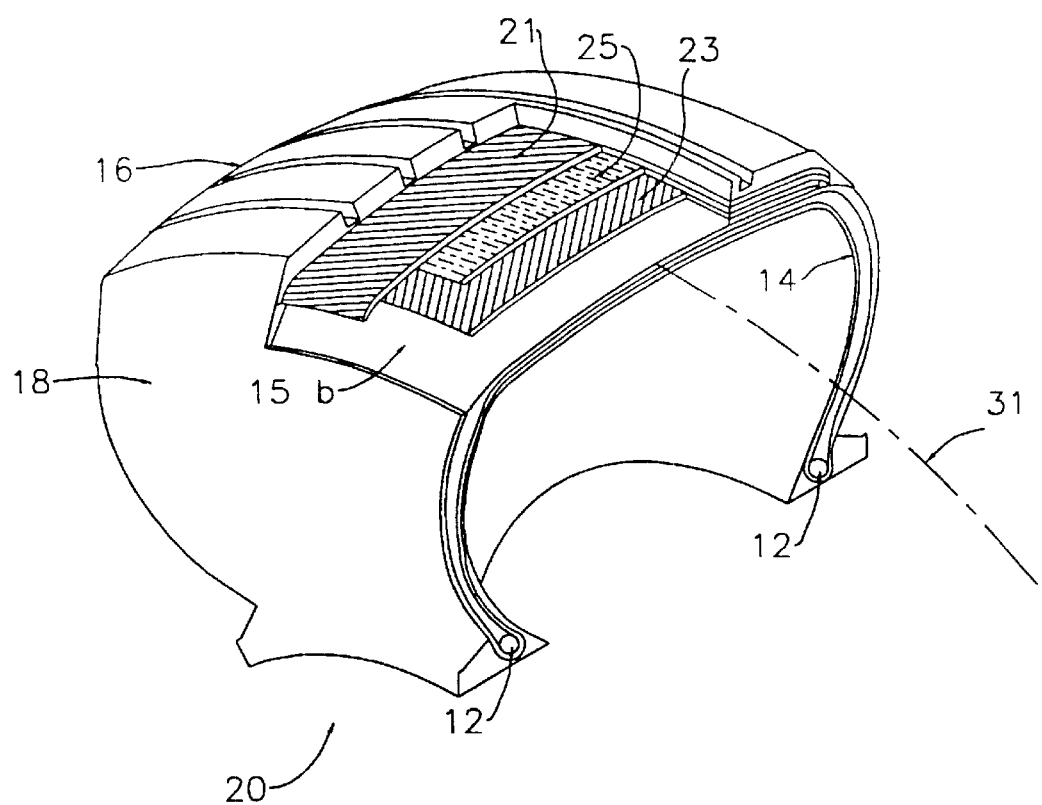
FIG. 2 illustrates a cut-away view of a tire segment showing an alternative belt package in a tire of the invention.

With reference now specifically to FIGS. 1 and 2, a tire 10 of the invention comprises at least a pair of parallel annular beads 12, at least one carcass ply 14 wrapped around the beads, and tread 16 disposed over the carcass ply in a crown area of the tire, and sidewalls 18 disposed between tread 16 and beads 12. Reinforcement package 15 is disposed between tread 16 and carcass 14. In FIG. 1, the reinforcement package 15a comprises two upper belts 22 and two lower belts 24 and a mid-ply belt 26 disposed between upper belts 22 and lower belts 24. Upper belts 22 have opposing angles of 15° to 38° with respect to the centerline 31 of belt package 15, as do lower belts 24. In the illustrated embodiment, the radially inner upper belt and the radially outer lower belt also have opposing angles with respect to each other. The tire of the invention may have one to three sets of beads, and one to sixteen carcass plies.

In the illustrated embodiment, mid-ply belt 26 is constructed of the same type materials as top belt 22 and lower belts 24, but is constructed so that the orientation of the reinforcement colds therein are at 0° to 5° with respect to the centerline 31 of belt package 15. Each reinforcement cord in mid-ply belt 26 has at least three interruptions around the circumference of the tire. The cord sections in the mid-ply belt are aligned end-toed in a plurality of spaced apart mutually parallel rows. The interruptions between the adjacent ends of any two sections of cords in one row are offset longitudinally with sect to interruptions between cord sections in an adjacent row. In other words, the interruptions in a given row are staggered with respect to the interruptions in an adjacent row. The reinforcement properties of the ply as a whole are uniform and continuous around the tire.

Reinforcement cords in the upper belts, lower belts, and mid-ply belt, in one illustrated embodiment are the same materials, but may be different materials of similar or different linear density, or the same materials of different linear density, and may be selected from the group comprising polyester, polyamide, fiberglass, carbon fibers, polyvinyl alcohol, aromatic polyamide (aramid), steel, rayon and similar materials known to those skilled in the art. The textile cords for reinforcement in the reinforcement package will preferably have a linear density of 2200 to 13,300 dTex (2,000 denier to 12,000 denier). The end count for the mid-ply belt may be 1.6 to 11.8 ends per centimeter (epc) (4 to 30 e.p.i.), and the standard belts may have an end count of 3 to 19.7 e.p.c. (8 to 50 e.p.i.).

In the particular design of the illustrated embodiment, it was found that best results were obtained when the end count of the reinforcement cords, and the linear density of the cords, in the mid-ply belt were reduced as compared to the end count of the reinforcement cords in the standard upper and lower belts, e.g., 3.9 to 7.9 e.p.c. (10 to 20 e.p.i.) (3,300 dTex) in the mid-ply belt as compared to 6.3 to 9.4 e.p.c. (16 to 24 e.p.i.) (6,700 dTex) in the standard belts.

Although the end counts in different kinds of tires and different sizes of tires may vary substantially because of the different materials used in construction, it is believed that in general, the best tire constructions will be achieved when the end count of a mid-ply belt is 50% to 90%, preferably 65% to 80% of the end count of the upper and lower belts.

It is desirable that the reinforcing elements used in the belts, and the mid-ply belt have a relatively high tensile modulus, i.e., a LASE (load at specified elongation) greater than 20 newtons at 4% elongation. The present invention permits the use of high modulus cords in the mid-ply belt since expansion of the mid-ply belt during the curing process can be taken up entirely by the gaps between the cord sections, as opposed to being taken up by slip around the overlap splice of the mid-ply belt. The interruptions open slightly under the action of expansion forces in the tire building process, and uniformly accommodate the change in circumferential length of the mid-ply belt.

With reference now to FIG. 2, in an alternative embodiment, tire segment 20 is shown having a reinforcement package 15b which comprises one top belt 21, one bottom belt 23 and one mid-ply belt 25. The reinforcement cords in top belt 21 and reinforcement cords in bottom belt 23 preferably have opposed angles relative to one another. Such a reinforcement package 15b is generally preferred in the construction of high performance tires.

Figure 3:
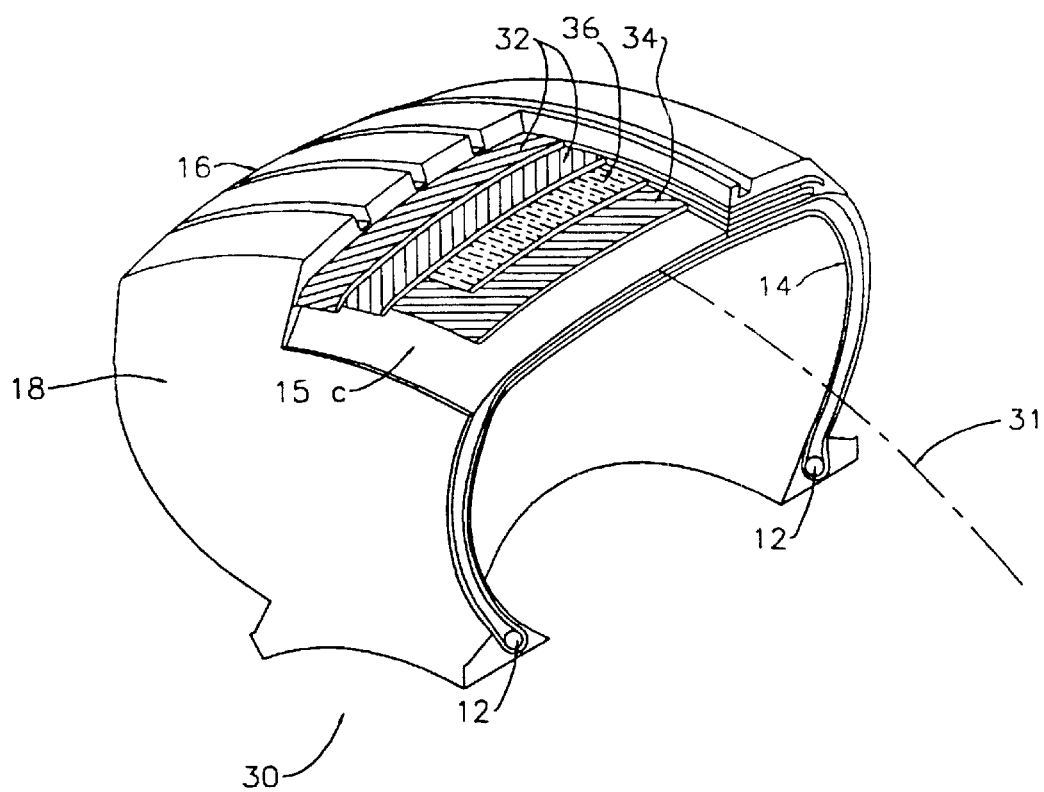
FIG. 3 illustrates a cut-away view of a tire segment illustrating an alternative belt package of the invention.

With reference now to FIG. 3, in another alterative embodiment, tire segment 30 comprises two upper belts 32, one bottom belt 34 and one mid-ply belt 36.

Figure 4:
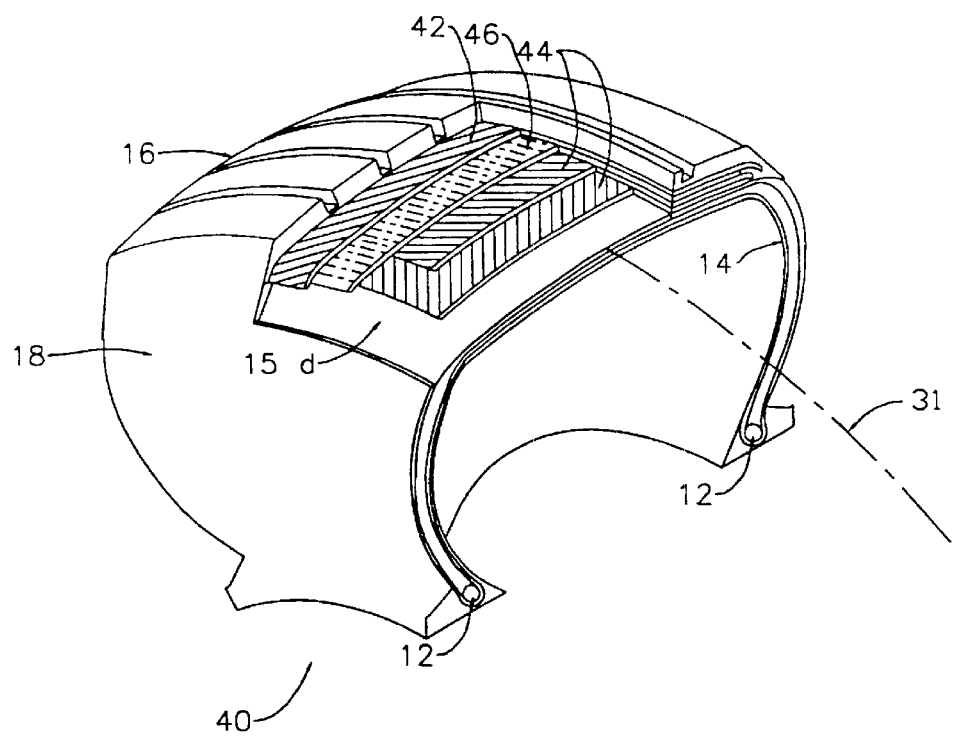
FIG. 4 illustrates a cut-away view of a segment of a tire illustrating another alternative embodiment of a belt package of the invention.

With reference now to FIG. 4, tire segment 40 illustrates an embodiment having one top belt 42, two lower belts 44, and one mid-ply belt 46.

Figure 5:
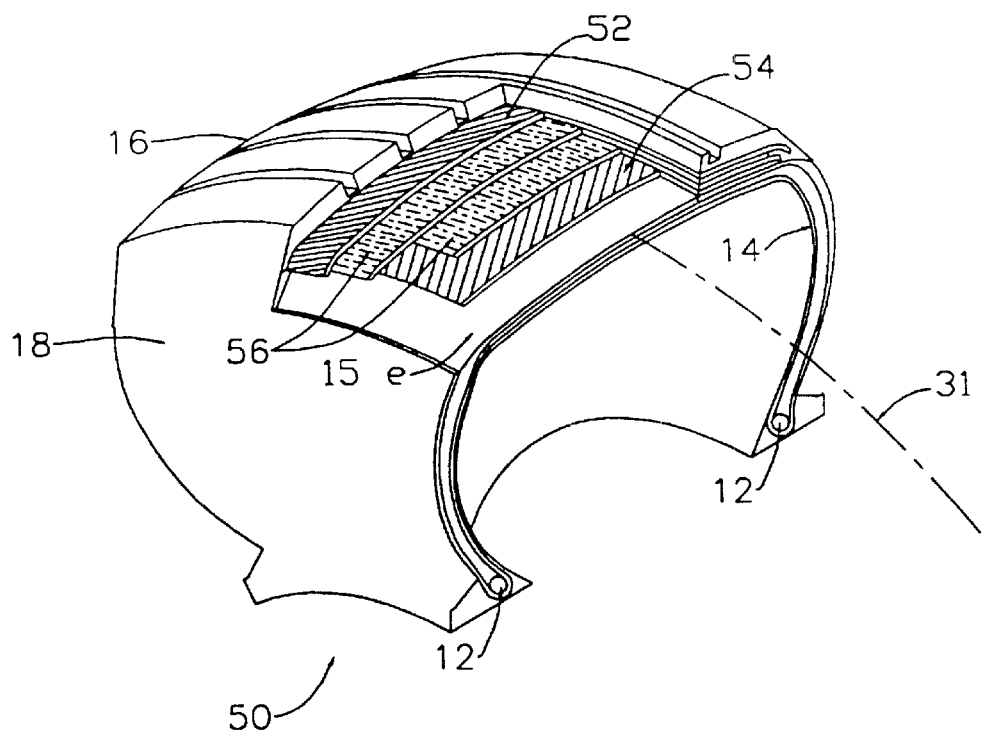
FIG. 5 illustrates a cut-away view of a tire segment illustrating another alternative embodiment of a belt package in a tire of the invention.

With reference to FIG. 5, tire segment 50 illustrates an embodiment having one top belt 52, one bottom belt 54, and two mid-ply belts 56.

Figure 6:
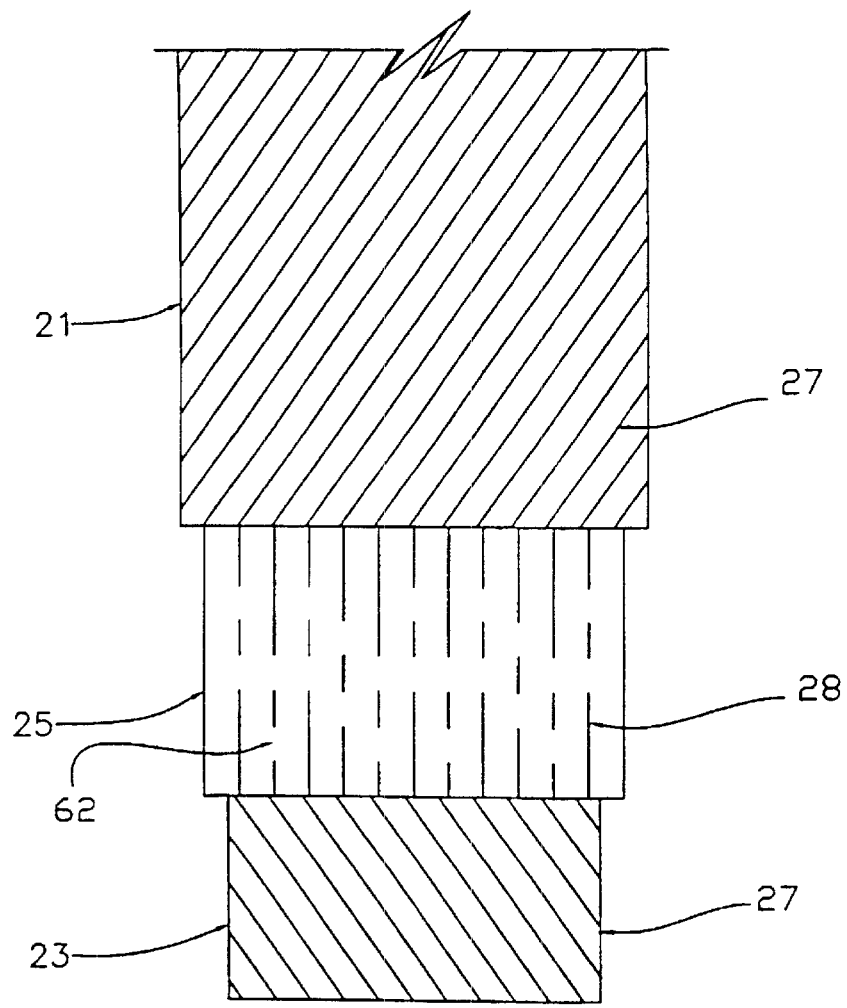
FIG. 6 illustrates an exemplary belt package of the invention.

With reference now to FIG. 6, reinforcement package 15b, as shown in the tire segment of FIG. 2, is illustrated showing the angular relationship of cords 27 in upper belt 21 and lower belt 23, as well as the 0° orientation of discontinuous filaments 28 in mid-ply belt 25. The interruptions 62 in discontinuous filaments 28 are randomly placed around the circumference of mid-ply belt 25 as described above.

In the embodiment illustrated in FIGS. 2 and 6, best results were achieved in a reinforcement package wherein upper belts 21 and lower belts 23 were made comprising reinforcement cords 27 having a linear density of 6,700 dTex (6000 denier) and an end count of 51 e.p.c. (20 ends per inch (e.p.i.)), whereas the mid-ply belt 25 had discontinuous cords or filaments 28 having a linear density of 3,300 dtex (3000 denier) and an end count of 41 e.p.c. (16 e.p.i.).

In the illustrated embodiment, the construction and design caused the green tire of the invention to have a diameter of 0.5 to 4% larger than conventional tires having the same rim diameter. The same tire molds were used to cure the tire, and accordingly, the extra material in the green tire is accounted for in a thicker crown section in the tire.

Also, very good results were achieved when the reinforcement cords in all three belts comprised polyethylene naphthalate (PEN).

The PEN cords used in the illustrated tire constructions were processed to provide better dimensional stability, a better tensile modulus, and other improved physical properties. Sample cords produced by the process had a nominal linear density of 1100/2/3 dTex (1000/2/3 denier), and a 4×4 twist tpi (turns per inch=about 10 turns per cm), and had a tenacity of 9.2 dN/tex (10.4 grams per denier (gpd)) and a tensile modulus of 230 dN/tex (260 gpd). Those skilled in the art will recognize that the total linear density of the sample cords described is 6700 dTex, and that different density cords may be processed in the same manner.

The cords used to prepare fabric may be dip using a single enddipping unit. Fabric may be prepared according to PCT application PCT/97/06757 or PCT97/17272. These applications are incorporated herein by reference. It is believed that the dipping procedure further enhances the properties of the PEN cord. Those skilled in the art will recognize that conventional fabric dipping can be used if safeguards are used to insure proper adhesion, dimensional stability, and maximum uniformity.

It is believed that the specific properties of the PEN cords are secondary, however, since the design or architecture of the belt package is most important to the properties of the tire, and other cord materials and combinations can be used to obtain the required belt package properties for a specified tire.

The invention is further illustrated with reference to the following examples.

EXAMPLE 1

In this and the following examples, the belts were made with 6700 dTex cords at 7.9 e.p.c. (20 e.p.i.), unless otherwise specified, and 3300 dTex reinforcement cords were used in the mid-ply belt, unless otherwise specified.

In this example, comparisons of tire properties were made for various constructions of tires of the invention and a commercial control tire having two steel cut belts and two turns of spiral overlay. The steel control is an Eagle GA tire, size P225/60R16, and has a polyester reinforced carcass and two-cut steel belts having steel reinforcing cords at opposing angles of 25 degrees, and 9.4 ends per centimeter (e.p.c.) (24 ends per inch (e.p.i.)), having construction number 19b. Comparisons were also made with a two-belt tire (no mid-ply belt) wherein the belts are reinforced with PEN (polyethylene naphthalate) reinforcing cords wherein 6700 dTex (6000 denier) PEN cords were used at an angle of 26 degrees and an end count of 7.9 e.p.c. (20 e.p.i.), construction number 10a. Also for comparison purposes, a similar two belt PEN tire was made wherein the two belts had opposing angles of ±30 degrees with resect to the EP (equatorial plane) of the tire, designated as tire 10j. A tire of the invention, construction number 10b, was made having an upper and lower 6700 dTex (6000 denier) PEN reinforced belts wherein the PEN reinforcement had opposing angles of 30 degrees in the two belts and an end count of 7.9 e.p.c. (20 e.p.i.), and a mid-ply belt having the same reinforcement as the upper and lower belts at an end count of 1.6 e.p.c. (4 e.p.i.). Various other tires of the invention, construction number 10m, 10n and 10p were made with various belt angles in the upper and lower belts (±24 and ±30 degrees), and with various end counts of PEN at 5.1 e.p.c. and 6.3 e.p.c. (13 e.p.i. and 16 e.p.i.) and 3300 dTex reinforcement in the mid-ply belt.

Rolling resistance data for the various tire constructions is illustrated in Table I.

The data shows that the rolling resistance of the tins of the invention is generally higher than the rolling resistance of the steel belt reinforced control tires.

Force and moment data for the various tire constructions is provided in Table II.

% CC is the normalized cornering coefficients of the tires as compared to the control, i.e., the control is 100%. Higher numbers are considered better.

% RR is the normalized rolling resistance of the tires as compared to the control. Lower is better.

% AT is the normalized aligning torque. Higher is considered better at the levels shown in this example.

TABLE I

ROLLING RESISTANCE

| CONSTRUCTION | % RR | CONSTR # |
|---|---|---|
| STEEL CONTROL | 100 | 19 b |
| 2 BELT +26°/−26° PEN CONTROL | 105 | 10 a |
| 3 BELT +30°/0°/−30° (PEN) | 117 | 10 b |
| 2 cut belts +30°/−30° (PEN) | 112 | 10 i |
| 3 blts, +30°/0°/−30°, 5.1 epc in 0° blt (PEN) | 126 | 10 m |
| 3 blts, +24°/0°/−24°, 5.1 epc in 0° blt (PEN) | 127 | 10 n |
| 3 blts, +30°/0°/−30°, 6.3 epc in 0° blt (PEN) | 125 | 10 p |

TABLE II

FORCE & MOMENT
@ 80% load, 35 psi

| CONST# | % CC | % AT |
|---|---|---|
| 19 b | 100 | 100 |
| 10 a | 81 | 102 |
| 10 b | 85 | 94 |
| 10 j | 67 | 108 |
| 10 m | 91 | 94 |
| 10 n | 95 | 81 |
| 10 p | 92 | 91 |

The data in Table II illustrates that tires of the invention have force and moment properties comparable (90–95% of the control) to the steel belt control even when extreme belt angles are used, e.g., ±30 degrees. Construction 10j, made with extreme belt angles and no mid-ply belt illustrates that extreme belt angles would otherwise have a substantial effect on force and moment data.

Table III compares the plunger test properties of the tires tested.

TABLE III

PLUNGER TEST

|  |  | DEFLECT cm (in) | ENERGY Kg-cm (lb-in) |
|---|---|---|---|
| Steel Control Tire | 19 b | 2.28 (5.8) | 1317 (7363) |
| PEN-2 Belt Tire | 10 a | 2.28 (5.8) | 1218 (6811) |
| PEN-3 Belt Tire | 10 b | 2.09 (5.3) | 1049 (5866) |

The data shows that the tire construction of the invention has an acceptable level of penetration resistance for this type of tire. The minimum requirement is 562.8 kg-cm (3146 in-lb.).

Table IV illustrates the residual self-aligning torque (RSAT) data, in Newton meters, and the residual cornering force (RCF) data, in Newtons, of the tire constructions tested.

TABLE IV

RSAT/RCF DATA

|  |  | RCF (N) | RSAT (N-M) | BELT ANG. |
|---|---|---|---|---|
| Steel Control Tire | 19 b | −86 | −3.48 | 25 |
| PEN-2 Belt Tire | 10 a | −81 | −4.05 | 26 |
| PEN-3 Belt Tire | 10 B | −116 | −5.58 | 30 |

It will be noted that the variance from zero for RSAT and RCF can be directly correlated with the angle of the reinforcement cords in the upper and lower belts.

Table V illustrates the high-speed data for the tire constructions tested.

A conventional high-speed endurance test for a tire consists of subjecting the tire to revolution speeds that gradually increase by steps of 10 km/hr (6.2 mi/hr). The tire, which is inflated to its maximum design pressure, is pressed against a drum with a force equivalent to its design load, reduced by a factor to account for the curvature of the drum, and the tire is then revolved with the drum for 10 minutes at each of a series of increasing speed steps. The tire speed endurance is measured by the highest speed step that the time can sustain during a given interval without being destroyed.

High Speed (HS) represents the results of the high speed test.

TABLE V

HIGH SPEED DATA

| CONSTRUCTION | V (PASS = 10 min. @ 258.4 Kmph (161.5 mph)) |
|---|---|
| 19 b | 3 min. @ 268.3 (167.7) |
| V-SPEED RATED | 6 min. @ 268.3 (167.7) |
| 10 a | 9 min. @ 248.5 (155.3) |
| | 6 min. @ 248.5 (155.3) |
| 10 b | 5 min. @ 238.6 (149.1) |

Table VI illustrates the savings in weight and materials of tires of the invention as compared to the control.

TABLE VI

TIRE WEIGHTS

| | Kg (lbs) | CONSTR # |
|---|---|---|
| Steel Control | 11.3 (24.90) | 19 b |
| 2 Belt Tire | 10.5 (23.00) | 10 a |
| 3 Belt Tire | 11 (24.10) | 10 b |
| 2 cut belts +/−30 | 10.4 (22.86) | 10 j |
| 3 blt, +/−30 w/5.1 epc blt 2 | 10.8 (23.84) | 10 m |
| 3 blt, +/−24 w/5.1 epc blt 2 | 10.8 (23.87) | 10 n |
| 3 blt, +/−30 w/6.3 epc blt 2 | 10.8 (23.71) | 10 p |

Table VII illustrates subjective ride and handling data of the tire constructions of the invention.

TABLE VII

PEN BELT R & H DATA TEST #2
Test Set Performance Relative to Control

| Control 19 B | 10 J | 10 M | 10 N | 10 P |
|---|---|---|---|---|
| Noise | + | + | + | = |
| Ride | ++ | + | + | + |
| Handling | + | = | = | − |

<-- WORSE EQUAL BETTER -->
--- -- - = + ++ +++

Resiliometer data for a +30/−30 cut PEN belts and a tire of the invention is provided in Table VIII.

TABLE VIII

| | | Mileage | Fail Code |
|---|---|---|---|
| 2 cut blts, +30/−30 | 10 j | 47276 | BEF |
| | | 52035 | No fail |
| 3 blts, +30/−30, 5.1 epc blt 2 | 10 m | 52586 | No fail |
| | | 52321 | No fail |

The mileage indicates miles run under the conditions of the resiliometer, and BEF indicates "belt edge failure."

EXAMPLE 2

Additional testing was carried out with a variety of tire constructions in an effort to compare the contributions of tire materials, as well as the tire constructions, to tire properties.

All the tires were made with a reduced ply coat, as compared to the experimental tires described in Example 1. The tires were identical except for the parameters described below. All the tires of the invention, except for construction 2e, were made having a mid-ply belt with an end count of 6.3 e.p.c. (16 e.p.i).

Also, all the tires were made with a polyester reinforced carcass ply, except as indicated. The angles of reinforcement in the belts are all measured with respect to the equatorial plane (EP) of the tire. All the cut belts have an end count of 7.9 e.p.c. (20 e.p.i.), unless otherwise indicated.

Construction 2a is a tire made with two 21° PEN cut belts.

2b is a tire of the invention (i.e., the tire was made with three belts counting the mid-ply belt with noncontinuous 0° reinforcement, and two 24° PEN cut belts) with a steel reinforced carcass ply.

2c is a tire of the invention made with two 24° PEN cut belts and a polyester carcass ply.

2d is a tire of the invention where the reinforcement in the two PEN cut belts is at 21°.

2e is a tire of the invention wherein the two cut belts have PEN reinforcement at 21°, and the mid-ply belt has PEN reinforcement at 7.9 e.p.c. (20 e.p.i).

2f is a two aramid cut belt tire wherein the aramid reinforcement is at an angle of 21°.

2g is a production control tire made with two steel belts and two turns of 940/2 dTex (840/2 denier) nylon spiral overlay.

The testing was carried out on a load wheel at 80% load and an inflation pressure of 23.9 Nscm (Newtons per square centimeter) (35 psi (pounds per square inch)). The data is illustrated in table IX.

TABLE IX

| Tire | % Control CC | % Control AT | % Control RR | Weight Kg (pounds) | HS Kmph (mph) |
|---|---|---|---|---|---|
| 2 a | 101.5 | 96 | 96.5 | 10.2 (22.5) | 6 min @ 228.6 (142.9) |
| | | | | | 4 min @ 228.6 (142.9) |
| 2 b | 109.1 | 84 | 105.0 | 11.2 (24.6) | 1 min @ 258.4 (161.5) |
| | | | | | 8 min @ 238.6 (149.1) |
| 2 c | 102.9 | 94 | 104.2 | 10.6 (23.4) | 3 min @ 258.4 (161.5) |
| | | | | | 4 min @ 258.4 (161.5) |
| 2 d | 102.1 | 88 | 105.5 | 10.6 (23.3) | 1 min @ 268.3 (167.7) |
| | | | | | 8 min @ 248.5 (155.3) |
| 2 e | 100.7 | 88 | 106.2 | 10.5 (23.2) | 3 min @ 258.4 (161.5) |
| | | | | | 6 min @ 248.5 (155.3) |
| 2 f | 100.7 | 109 | 91.6 | 9.9 (21.8) | 1 min @ 228.6 (142.9) |
| | | | | | 6 min @ 218.7 (136.7) |
| 2 g | 100.0 | 100 | 100.0 | 11.1 (24.5) | 4 min @ 248.5 (155.3) |
| | | | | | 5 min @ 258.4 (161.5) |

The data shows that tires of the invention 2c and 2d gave high-speed results better than the control, and 2b and 2e gave results similar to the control.

Also, all the ties of the invention had similar to better than the control cornering coefficient properties as well as a reduced weight.

All the tires of the invention have slightly higher rolling resistance than the control.

While the invention has been specifically illustrated and described, those skilled in the art will recognize that the invention can be variously modified and practiced without d parting form the spirit of the invention. The invention is limited only by the scope of the following claims.

What is claimed is:

1. A pneumatic tire comprising at least two parallel annular beads (12), at least one carcass ply (14) wrapped around said beads, tread (16) disposed over said carcass plies in a crown area of said tire, sidewalls (18) disposed between said tread (16) and said beads (12), and a reinforcement package (15a–e) comprising a plurality of belts or breakers disposed between said tread (16) and carcass (14), wherein said reinforcement package (15a–e) has at least one lower belt (23,24,34,44,54) comprising continuous parallel reinforcement cords or filaments disposed radially inward in said reinforcement package, at least one upper belt (21,22, 32,42,52) comprising continuous parallel reinforcement cords or filaments disposed radially outward in said reinforcement package, and at least one middle reinforcement ply (25,26,36,46,56) comprising discontinuous parallel textile reinforcement cords or filaments (28) disposed between said upper and lower belts wherein said discontinuous textile cords or filaments (28) are oriented parallel to the centerline (31) of said reinforcement package (15a–e) and wherein the end count of reinforced cords or filaments (28) in a mid-ply belt comprises 50% to 90% of the end count of the reinforcement cords (27) of an upper or lower belt.

2. The tire of claim 1 wherein said reinforcement package has two upper belts (22), two lower belts (24) and one middle belt (26).

3. The tire of claim 1 wherein said reinforcement package has one upper belt (21), one lower belt (23) and one middle belt (25).

4. The tire of claim 1 wherein said reinforcement package has two upper belts (32), one lower belt (34) and one middle belt (36).

5. The tire of claim 1 wherein said reinforcement package has one upper belt (42), two lower belts (44) and one middle belt (46).

6. The tire of claim 1 wherein said reinforcement package has one upper belt (52), one lower belt (54) and two middle belts (56).

7. The tire of claim 1 wherein the upper and lower belts have reinforcing cords (27) having alternating opposing angles of about 30 degrees with respect to the EP of the tire.

8. The tire of claim 1 wherein reinforcing cords (27) in said upper and lower belts and reinforcing cords (28) in said mid-ply belt comprise polyethylene naphthalate.

9. The tire of claim 1 wherein the discontinuous textile cords of the middle belt have a load at specified elongation greater than 20 newtons at 4% elongation.

10. The tire of claim 1 wherein the reinforcement cords or filaments (28) in a mid-ply belt have a linear density less than the linear density of the reinforcement cords (27) of an upper or lower belt.

11. A pneumatic tire comprising at least two parallel annular beads (12), at least one carcass ply (14) wrapped around said beads, tread (16) disposed over said carcass plies in a crown area of said tire, sidewalls (18) disposed between said tread (16) and said beads (12), and a reinforcement package (15a–e) comprising a plurality of belts or breakers disposed between said tread (16) and carcass (14), wherein said reinforcement package (15a–e) has at least one lower belt (23,24,34,44,54) comprising continuous parallel reinforcement cords or filaments disposed radially inward in said reinforcement package, at least one upper belt (21,22, 32,42,52) comprising continuous parallel reinforcement cords or filaments disposed radially outward in said reinforcement package, and at least one middle reinforcement ply (25,26,36,46,56) comprising discontinuous parallel reinforcement cords or filaments (28) disposed between said upper and lower belts wherein said discontinuous cords or filaments (28) are oriented parallel to the centerline (31) of said reinforcement package (15a–e) and wherein the end count of reinforcement cords (28) in the at least one middle reinforcement ply comprises 50% to 90% of the end count of the reinforcement cords (27) of an upper or lower belt.

12. The tire of claim 11 wherein said reinforcement package has two upper belts (22), two lower belts (24) and one middle belt (26).

13. The tire of claim 11 wherein said reinforcement package has one upper belt (21), one lower belt (23) and one middle belt (25).

14. The tire of claim 11 wherein said reinforcement package has two upper belts (32), one lower belt (34) and one middle belt (36).

15. The tire of claim 11 wherein said reinforcement package has one upper belt (42), two lower belts (44) and one middle belt (46).

16. The tire of claim 11 wherein said reinforcement package has one upper belt (52), one lower belt (54) and two middle belts (56).

17. The tire of claim 11 wherein the reinforcement cords or filaments (28) in a mid-ply belt have a linear density less than the linear density of the reinforcement cords (27) of an upper or lower belt.

* * * * *